United States Patent
Brodie et al.

(10) Patent No.: US 12,264,554 B2
(45) Date of Patent: Apr. 1, 2025

(54) VALVE ARRANGEMENT

(71) Applicant: PETROLEUM TECHNOLOGY COMPANY AS, Stavanger (NO)

(72) Inventors: Alan David Brodie, Abu Dhabi (AE); Rylan Paul D'Souza, Abu Dhabi (AE)

(73) Assignee: PETROLEUM TECHNOLOGY COMPANY AS, Stavanger (NO)

( * ) Notice: Subject to any disclaimer, the term of this patent is extended or adjusted under 35 U.S.C. 154(b) by 296 days.

(21) Appl. No.: 17/623,728

(22) PCT Filed: Jun. 24, 2020

(86) PCT No.: PCT/NO2020/050177
§ 371 (c)(1),
(2) Date: Dec. 29, 2021

(87) PCT Pub. No.: WO2021/002757
PCT Pub. Date: Jan. 7, 2021

(65) Prior Publication Data
US 2022/0170343 A1    Jun. 2, 2022

(30) Foreign Application Priority Data

Jul. 3, 2019   (NO) .................................. 20190835

(51) Int. Cl.
*E21B 34/02*   (2006.01)
*F16K 31/12*   (2006.01)
(52) U.S. Cl.
CPC .............. *E21B 34/02* (2013.01); *F16K 31/12* (2013.01)

(58) Field of Classification Search
CPC ...... E21B 34/02; E21B 34/025; E21B 33/062; E21B 33/072; Y10T 137/8275;
(Continued)

(56) References Cited

U.S. PATENT DOCUMENTS

| 404,503 | A | * | 6/1889 | Ross | G05D 16/10 137/490 |
| 517,550 | A | * | 4/1894 | Messinger | F16K 1/42 222/400.5 |

(Continued)

FOREIGN PATENT DOCUMENTS

| WO | 2009102214 A1 | 8/2009 |
| WO | 2018106119 A2 | 6/2018 |

OTHER PUBLICATIONS

International Search Report corresponding to related International Application No. PCT/NO2020/050177, mailed Sep. 1, 2020, 3 pages.
(Continued)

*Primary Examiner* — Craig J Price
(74) *Attorney, Agent, or Firm* — K&L Gates LLP

(57) ABSTRACT

A valve arrangement for a wellhead of a hydrocarbon well comprises a valve for mounting in a port of a wellhead, and an actuator device for actuating the valve to move to an open position. The actuator device comprises a housing having a through channel extending between a first end, at which the valve is mounted, and a second end. The housing comprises at least one first port that leads into the through channel. The actuator device further comprises an actuator rod that is movably arranged in the through channel and configured to open the valve by the actuator rod being movable between at least a first position and a second position, and a control device arranged to control the movement of the actuator rod.

12 Claims, 1 Drawing Sheet

(58) Field of Classification Search
CPC ............ Y10T 137/7782; F16K 39/045; F16K 39/026; F16K 31/12; F16K 31/1223; F16K 31/1226; F16K 31/14; F16K 31/143; F16K 31/508; F16K 31/50
USPC ... 251/219, 221, 82, 63, 325, 225, 120, 291, 251/264; 137/522, 495
See application file for complete search history.

(56) References Cited

U.S. PATENT DOCUMENTS

| | | | | |
|---|---|---|---|---|
| 595,994 | A * | 12/1897 | Culver | F16K 1/02 251/219 |
| 770,866 | A * | 9/1904 | Mullin | F04B 43/107 251/63 |
| 843,391 | A * | 2/1907 | Ferris | F16K 31/122 251/63 |
| 926,885 | A * | 7/1909 | Lippold | F16K 31/508 251/210 |
| 1,566,814 | A * | 12/1925 | Bliss | B61D 27/0036 251/74 |
| 1,780,387 | A | 11/1930 | Hart | |
| 2,308,135 | A * | 1/1943 | White | F16K 31/122 251/23 |
| 2,524,264 | A * | 10/1950 | Knox | G05D 16/107 137/538 |
| 2,788,192 | A * | 4/1957 | Mountford | G05D 7/0126 137/505.22 |
| 2,908,477 | A * | 10/1959 | Buri | F16K 31/143 251/285 |
| 3,088,480 | A | 5/1963 | Yancey | |
| 3,272,222 | A | 9/1966 | Allen | |
| 3,389,718 | A * | 6/1968 | Johnson | F16K 17/10 251/28 |
| 3,420,493 | A * | 1/1969 | Kraft | F16K 15/18 251/285 |
| 3,587,634 | A * | 6/1971 | Krause | F16K 31/46 137/553 |
| 3,631,887 | A * | 1/1972 | Schlechtriem | F16K 15/18 251/63.4 |
| 3,631,888 | A * | 1/1972 | Anton | F16K 15/1826 251/63.4 |
| 3,692,316 | A * | 9/1972 | Bishop | E21B 33/062 251/1.3 |
| 3,828,986 | A * | 8/1974 | Roth | B05B 9/00 141/261 |
| 4,213,480 | A | 7/1980 | Orum et al. | |
| 4,214,605 | A | 7/1980 | Hardgrave | |
| 4,624,445 | A * | 11/1986 | Putnam | F15B 13/01 251/63.4 |
| 4,637,463 | A | 1/1987 | McCoy | |
| 4,691,893 | A | 9/1987 | Akkerman et al. | |
| 5,755,424 | A * | 5/1998 | Ryd | F16K 35/00 251/63 |
| 8,141,663 | B2 * | 3/2012 | Lyon | E21B 4/14 175/296 |
| 8,684,073 | B2 * | 4/2014 | Sevheim | E21B 33/03 166/87.1 |
| 9,133,958 | B2 * | 9/2015 | Larsen | F16K 31/1221 |
| 2003/0116732 | A1 * | 6/2003 | Chatufale | F16K 3/0254 251/14 |
| 2008/0264646 | A1 | 10/2008 | Sten-Holverson et al. | |
| 2015/0144816 | A1 | 5/2015 | Hoang | |
| 2017/0130577 | A1 | 5/2017 | Cheng et al. | |
| 2022/0170342 | A1 * | 6/2022 | Harestad | F16K 31/122 |

OTHER PUBLICATIONS

International Written Opinion corresponding to related International Patent Application No. PCT/NO2020/050177, mailed Sep. 1, 2020, 6 pages.
Norwegian Search Report corresponding to related Norwegian Application No. 20190835, Report dated Feb. 3, 2020, 2 pages.
International Search Report corresponding to related International Application No. PCT/NO2020/050178, mailed Sep. 8, 2020, 3 pages.
International Written Opinion corresponding to related International Patent Application No. PCT/NO2020/050178, mailed Sep. 8, 2020, 6 pages.
Norwegian Search Report corresponding to related Norwegian Application No. 20190833, Report dated Jan. 30, 2020, 2 pages.
GCC Examination Report corresponding to related GCC Application No. GC 2020-40029, mailed Sep. 10, 2021, 4 pages.

* cited by examiner

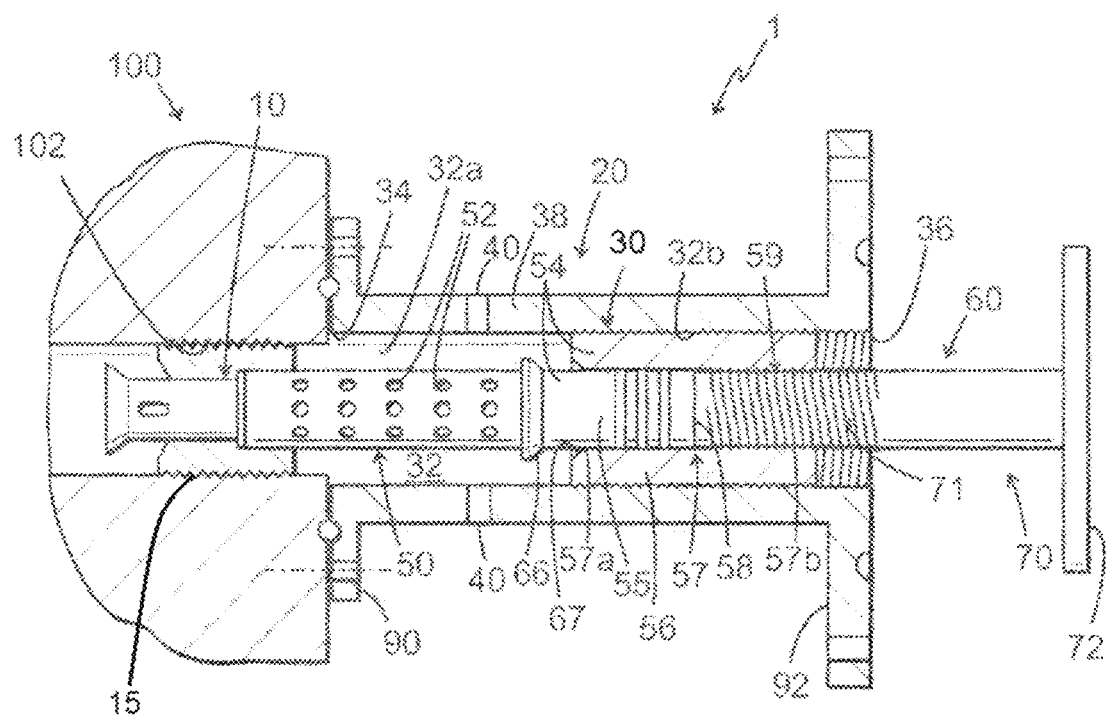

VALVE ARRANGEMENT

CROSS REFERENCE TO RELATED APPLICATIONS

The present application is a National Stage of International Application No. PCT/NO2020/050177, filed on Jun. 24, 2020, which claims priority to Norwegian Patent Application No. 20190835, filed on Jul. 3, 2019, the entire contents of each of which are being incorporated herein by reference.

TECHNICAL FIELD

The present disclosure relates to a valve arrangement for a wellhead. For example, the valve arrangement is of a type that may be used to vent fluid from a well annulus or to inject fluid into a well annulus, via e.g. a surface wellhead, a subsea wellhead or a valve tree port, e.g. in a hydrocarbon well.

BACKGROUND

An oil and/or gas well is drilled into a hydrocarbon bearing earth formation, where the well is typically completed in order to allow hydrocarbon production from the formation. Such a formation may be comprised of several different layers, where each layer may contain one or more hydrocarbon components. Often, such a formation will also contain water, gas, etc. Due to this, the conditions of production, i.e. the amount of oil, gas, water and pressure in the formation, will generally vary through the different layers of the formation, and will also vary during the production lifetime of the well. This may require intervention in the well and for this, suitable equipment is required, such as valve systems.

One such type of equipment is gas lift valves. Hydrocarbon production often begins with sufficient pressure in the formation to force the hydrocarbons to the surface. As the production from the well continues, the reservoir usually loses pressure until sufficient production of hydrocarbons from the well is no longer provided by the formation pressure. In some wells, the formation pressure as such is insufficient to support the production from the well already from the start.

Usually an injection fluid, e.g. high pressure natural gas, is injected into the annulus of production tubing string through a gas lift valve arrangement at the wellhead. Further down in the tubing string there are gas lift valves incorporated in the production tubing string, which are used to feed the injection fluid from the annulus and into the tubing. At both locations, the gas lift valves must reliably provide one-way fluid flow only and prevent undesirable leakage of production fluids into the annulus and the wellhead.

As mentioned, the present disclosure relates to a valve arrangement at the wellhead. Generally such valve arrangements comprise a valve that opens when pressurized injection fluid is feed into the valve, and it closes automatically by means of an elastic element when the infeed of injection fluid stops. However, there are occasions when the pressure difference across the movable member of the valve is such that the valve will not open when injection fluid is fed into the valve, due to higher pressure on the annulus side of the valve. There is then a need to bleed off or vent fluid from the annulus side by forcing the valve to open. There are also occasions when there may be a need to bleed off due to pressure inside the valve arrangement, e.g. when a VR plug is to be removed. This can be done by special arrangements. Examples of prior art are WO 2018/106119 and WO 2009/102214.

An objective of the present disclosure is to provide a valve arrangement that provides advantages over known solutions and techniques with regard to the above mentioned and other aspects.

SUMMARY

The above objective and other objectives are obtained by the arrangement and method of the present disclosure.

According to one example is provided a valve arrangement for a wellhead of a hydrocarbon well, the valve arrangement comprising a valve comprising connection elements configured for sealingly and removably mounting of the valve in a port of a wellhead, an actuator device for actuating the valve to move to an open position, the actuator device comprising a housing having a through channel extending between a first end, at which the valve is mounted, and a second end, the housing comprising at least one first port extending through a side wall of the housing and leading into the through channel, an actuator rod that is movably arranged in the through channel and which is configured to open the valve by the actuator rod being movable between at least a first position and a second position, a control device arranged to control the movement of the actuator rod, characterised in that the through channel comprises a first part and a second part, a piston-cylinder arrangement is arranged in the second part of the through channel in a sealing manner, the first part of the through channel is delimited by the valve at one end and by the piston-cylinder arrangement at the other end, and the at least one first port is a bleed off port and/or connectable to an external injection fluid source and it leads into the first part of the through channel.

By arranging the at least one port as a bleed off port and/or connectable to an external injection fluid source and further having this port leading into the first part of the through channel is obtained the advantage of less leakage due to the port being close to the valve. There are also fewer components of the new arrangement as compared to prior art. The new arrangement is simpler, more compact and also cost-saving. If compared to the prior art of WO 2018/106119, the present housing may be compared to what is called the spool in WO 2018/106119. The at least one port can be used for bleed off with regard to pressure built up in the through channel. Alternatively, or in addition, the port can be used for fluid injection, e.g. injection of gas or chemicals into the well via the valve, e.g. for gas lift operations. There may be more than one port leading into the first part of the through channel, in which case there may be separate ports for bleed off and fluid injection, or the ports may be configured for the combined use. Usually, when the port is used for bleed off, a suitable valve will be connected to the port from the outside.

In one example, the actuator rod is located inside the first part of the through channel. The actuator rod is consequently located in a part where the first port is arranged, thus providing for a compact design.

In one example, at least a part of the actuator rod comprises a hollow tube provided with perforations made at an angle to its direction of movement. This will make the piston lighter and the perforations will also work to facilitate injection and bleed off.

Alternatively, the actuator rod may be configured without a through bore in a longitudinal direction thereof. By having this design it will be possible to exert a higher force on the end of the actuator rod by means of e.g. a piston, due to a larger effective area, than if there was an opening of a through bore.

In one example, the piston-cylinder arrangement comprises a movable piston that is connected to the actuator rod.

In one example, the control device is configured to control a movement of the piston and thereby control the movement of the actuator rod connected to the piston. This is a simple solution since the actuator rod can actually be operated and moved between its positions by means of a piston.

In one example, the control device is configured to be manually operable.

In one example, the piston-cylinder arrangement comprises a cylinder that is fixed inside the second part of the through channel and which cylinder has a through bore, and the piston-cylinder arrangement comprises a piston that is movable inside a first part of the through bore in a sealing manner, which first part is open towards the first part of the through channel, and said piston forming part of the actuator device, wherein the actuator rod is connected to the piston, and the piston being movable in relation to the cylinder by means of the control device. This provides for a possibility for a new solution for a control device.

In one example, the through bore of the cylinder of the piston-cylinder arrangement comprises a second part, which second part is open towards an exterior of the housing and configured to receive the control device in order for the control device to engage with the piston. This makes it possible to use a control device from the exterior.

In one example, the control device comprises a control tool that is insertable into the second open part of the through bore of the cylinder. The control tool is configured to engage with the piston and move the piston. The control tool may be removable.

The second part of the through bore may comprise a threaded section, and the control device may then comprise a control tool having a threaded shaft and a turning handle for turning the threaded shaft, which threaded shaft is configured to be insertable into the second part of the through bore and to enter into threaded engagement with the threaded section, and to engage with an end part of the piston when inserted into the second part of the through bore. Through this, the shaft can be screwed into the through bore and enter into contact with an end part of the piston and thereby move the piston and the actuator rod by screwing the shaft further into the through bore. The piston and the piston rod can thereby be controlled from outside of the valve arrangement. The actuator device is thus mechanical. Furthermore, a completely mechanical solution is provided and there is no need for, e.g. any hydraulic fluid connections.

This also makes it possible to have a control tool that is removable from the valve arrangement.

In one example, the cylinder of the piston-cylinder arrangement is connected to the housing by a thread connection and fulfils the function of a valve removal plug.

Generally, the end of the actuator rod that faces towards the valve will be configured such that it can engage with the valve and the opening mechanism of the valve. The details of the configuration of the engaging end of the actuator rod will be adapted to the concerned type of valve, as will be understood and can be realised by a skilled person on a case to case basis.

The described valve arrangement can be used for fluid injection, including injection of pressurized gas and also injection of chemicals, as well as for bleed off.

The described valve arrangement offers a solution that makes it possible to manually operate the actuator device to open the valve, by means of the manually operable control device.

Further features and advantages of the present disclosure will also become apparent from the following detailed description of embodiments.

BRIEF DESCRIPTION OF THE DRAWINGS

The present disclosure will now be described in more detail, with reference being made to the enclosed schematic drawings illustrating examples according to the present disclosure, and in which:

FIG. 1 shows a first example of a valve arrangement according to the present disclosure.

DETAILED DESCRIPTION

In FIG. 1 is schematically illustrated an example of a valve arrangement 1 for a wellhead 100 of a hydrocarbon well. The valve arrangement comprises a valve 10 comprising connection elements 15 configured for sealingly and removably mounting of the valve in a port 102 of a wellhead, and an actuator device 20 for actuating the valve to move to an open position. The actuator device comprises:

a housing 30 having a through channel 32 extending between a first end 34, at which the valve is mounted, and a second end 36, the housing comprising at least one first port 40 extending through a sidewall 38 of the housing and leading into the through channel, an actuator rod 50 that is movably arranged in the through channel 32 and which is configured to open the valve 10 by the actuator rod being movable between at least a first position and a second position, and a control device 60 arranged to control the movement of the actuator rod.

The through channel 32 comprises a first part 32a and a second part 32b, and a piston-cylinder arrangement 54 that is arranged in the through channel in a sealing manner. The first part 32a of the through channel 32 is delimited by the valve 10 at one end and by the piston-cylinder arrangement 54 at the other end. The at least one first port 40 is a bleed off port and/or connectable to an external injection fluid source and it leads into the first part 32a of the through channel 32.

The actuator rod 50 is located inside the first part 32a of the through channel 32.

In the example in FIG. 1, the piston-cylinder arrangement 54 comprises a movable piston 55 that connected to the actuator rod 50. The piston is thus part of the actuator device 20.

The piston-cylinder arrangement 54 also comprises a cylinder 56 that is fixed inside the second part 32b of the through channel 32, and the cylinder 56 has a through bore 57. The piston 55 of the piston-cylinder arrangement is movable inside a first part 57a of the through bore 57 in a sealing manner. This first part 57a is open towards the first part 32a of the through channel 32. The piston 55 forms part of the actuator device 20, the actuator rod 50 is connected to the piston 55 and the piston is movable in relation to the cylinder by means of the control device 60. The seals are schematically illustrated in the FIGURE as O-rings on the circumferential surface of the piston, but they can of course also be located in the internal surface of the through bore, or have any other suitable configuration.

The control device 60 is configured to control the movement of the piston 55 and thereby control the movement of the actuator rod 50 connected to the piston. The piston and the actuator rod can be moved by the control device 60 between a first position in which the valve 10 is closed, and a second position in which valve 10 is open, and back to the first position closing the valve.

In one example, the control device 60 is configured to be manually operable.

In the shown example, at least a part of the actuator rod 50 comprises a hollow tube provided with perforations made at an angle to its direction of movement. The perforations may generally be made in the transverse direction of the actuator rod and extend through the actuator rod, from one side to the opposing side.

Alternatively, the actuator rod 50 may be configured as a solid rod without a through bore in the longitudinal direction thereof.

In one example, the piston-cylinder arrangement 54 comprises a cylinder 56 that is fixed inside the second part 32b of the through channel and which cylinder has a through bore 57, and the piston-cylinder arrangement comprises a piston 55 that is movable inside a first part 57a of the through bore 57 in a sealing manner, which first part 57a is open towards the first part 32a of the channel 32, and said piston forming part of the actuator device 20, wherein the actuator rod 50 is connected to the piston, and the piston being movable in relation to the cylinder by means of the control device 60.

In one example, as shown in FIG. 1, the through bore 57 of the cylinder 56 of the piston-cylinder arrangement 54 comprises a second part 57b, which second part is open towards an exterior of the housing 30 and configured to receive the control device in order for the control device to engage with the piston 55.

The control device may comprise a control tool that is insertable into the second open part of the through bore of the cylinder.

In one example, the second part 57b of the through bore 57 comprises a threaded section 59. The control device comprises a control tool 70 having a threaded shaft 71 and a turning handle 72 for turning of the threaded shaft. The threaded shaft is configured to be insertable into the second part 57b of the through bore 57 and to enter into threaded engagement with the threaded section 59, and to also engage with an end part 58 of the piston, when inserted into the second part 57b of the through bore. The shaft 71 can thus be screwed into the through bore 56 and enter into contact with an end part 58 of the piston 55 and thereby move the piston and the actuator rod to open the valve 10 by screwing the shaft 71 further into the through bore 57. An example of this type of control device is shown in FIG. 1. In order to close the valve, or at least not force the valve to stay in the open position, the control tool can be screwed in the opposite direction and relieve the valve from the exerted force.

In this context, it should be mentioned that by the wording "engage with" can include a coupling engagement but it may also include a simple contact between the two elements. For example, the end of the shaft can simply push on the end of the piston and thereby move the piston.

The described control tool can be removable from the valve arrangement. This may be done by unscrewing the shaft from the engagement with the threaded section.

In one example, the cylinder 56 of the piston-cylinder arrangement 54 may be screwed into the housing 30 and fulfil the function of a valve removal plug.

Further details and functions will now be described.

The valve 10 in the valve arrangement may generally be a gas lift valve or a surface annular safety valve, in the form of a check valve. For example, it may be a valve corresponding to the valve part insertable in the wellhead as disclosed in WO 2009/102214. The valve is only schematically illustrated in FIG. 1. Such a valve will open when it is pressurized by feeding an injection fluid under pressure into the volume formed by the first part 32a of the through channel 32. The valve will close automatically, by means of being equipped with an elastic element, such as a spring, when the pressure ceases. However, under certain circumstances, as already described, it is necessary to have the possibility to open the valve by force, i.e. mechanically. In order to safely attach the valve 10 and the housing 30 in a wall of a wellhead 100, the housing usually comprises a flange 90 by means of which it can be mounted to a well head. The housing may also be provided with a flange 92 at its other end for attachment to other equipment.

In one example, the first port 40 opening into the first part 32a of the through channel 32, which first channel part is in communication with the valve, may be used for injection of fluid as described above. The port 40 may also, or alternatively, be used as a bleed off port for example when the pressure of a fluid on the well side of the valve is too high.

Bleeding off can be achieved as described in the following. The piston 55 is movably guided in the first part 57a of the through bore 57 of the cylinder 56 that is fixed inside the second part 32b of the through channel 32. The control device comprises the control tool 70 that is removable from the housing 30, or at least the handle part 72 of the control tool is removable. When the valve 10 is to be opened, the threaded shaft 71 of the control tool is inserted into the corresponding threaded section 59 provided in the second part 57b of the through bore 57 in the cylinder 56. By turning the handle, the shaft is screwed further into the through bore 57 until it enters into contact with the end part 58 of the piston 55. By screwing further, the piston 55, with the actuator rod 50, is pressed and moved towards the valve 10, until the actuator rod enters into contact with an opening mechanism of the valve. The end of the actuator rod 50 that faces towards the valve will be configured such that it can engage with the valve and the opening mechanism of the valve. When the actuator rod 50 is in contact with the valve it will then provoke the opening of the valve, and fluid from the well side of the valve can flow through the valve and into the first channel part 32a, and further out through the first port 40. Thereby a bleed off is achieved.

After bleed off, the valve 1 may be released by screwing the control tool in an opposite direction, out of the through bore 57, and the valve 10 will automatically close. If there exists some fluid pressure in the first channel part 32a this may result in that the piston and actuator rod move back, to the right in FIG. 1. Alternatively, the valve 10 can be kept open by the actuator device 20 after bleed off and the first port 40 can then be connected to an injection fluid source that will feed injection fluid under pressure into the first channel part 32a, through the valve 10 and into the tubing that the valve is connected to. Alternatively, injection fluid can be fed into the first part 32a of the through channel 32 via another first port 40 leading into the first part 32a. After the start of injection of injection fluid, the piston 55 with the actuator rod 50 may be retracted and the valve will still keep open by means of pressure from the injection fluid. The piston with the actuator rod will generally retract due to the pressure in the first channel part 32a. If the control tool 70 has been unscrewed at least somewhat in the through bore 57, there will be space in the through bore 57 for the piston to move back, further into the through bore (towards right in FIG. 1). In order for the piston not to move unnecessarily far into the through bore 57, there may be provided a stop member 66 on the outside of the piston 55. A corresponding recess 67 may be provided in the end face of the cylinder 56, against which the stop member can abut. When the stop member reaches the end face of the cylinder 56, the piston 55 is prevented from moving further into the through bore 57. The stop member 66 can also have an additional function by being designed, for example, as a collar projecting from the outside of the piston. The pressure from the inflowing fluid in the volume inside the first channel part 32a can then work on the projecting surface of the collar and contribute to making the piston move back into the through bore 57. As an alternative, there may be a coupling provided between the piston end and the corresponding end of the shaft 71 such that the piston can be actively retracted by means of the tool 70 being screwed out, at least partly, of the threaded section 59.

In FIG. 1 is illustrated two first ports 40 leading into the first part 32a of the through channel 32. If one of the first ports is used only for bleed off, the other of the first ports may be used for connection to an injection fluid source. Generally, there may be several ports that are also used for other purposes, e.g. to ensure that trapped air can be removed during installation of the valve arrangement, to ensure that pressure testing can be done. Such ports may generally be provided with a plug after installation and testing of the valve arrangement, or have a valve installed for sealing.

The different elements disclosed in this description, the following claims or the accompanying drawings, expressed in their specific forms or in terms a means for performing a disclosed function, or a method or process for attaining the disclosed result, may, separately or in any combination of such elements, be utilised for realising the present disclosure in diverse forms thereof.

The present disclosure shall not be considered limited to the illustrated examples, but can be modified and altered in many ways, as realised by a person skilled in the art, without departing from the scope defined in the appended claims. For examples, details from one example may in many cases be applicable also to other examples.

The invention claimed is:

1. A valve arrangement for a wellhead of a hydrocarbon well, the valve arrangement comprising:
  a valve comprising a threaded connection configured to mount sealingly and removably, the valve in a port of the wellhead,
  an actuator device configured to actuate the valve to move between a closed position and an open position, the actuator device comprising:
    a housing having a through channel extending between a first end, at which the valve is mounted, and a second end, the housing comprising at least one first port extending through a sidewall of the housing and leading into the through channel,
    an actuator rod movably arranged in the through channel and configured to open the valve by the actuator rod being movable between at least a first position and a second position,
    a control device arranged to control the movement of the actuator rod,
    wherein the through channel comprises a first part and a second part,
    wherein a piston-cylinder arrangement is arranged in the second part of the through channel in a sealing manner,
    wherein the first part of the through channel is delimited by the valve at one end and by the piston-cylinder arrangement at the other end,
    wherein the at least one first port is a bleed off port and/or connectable to an external injection fluid source and it leads into the first part of the through channel, wherein the valve arrangement is configured such that:
      when the valve is in the open position, there is fluid communication between the at least one first port and the wellhead, and
      when the valve is in the closed position, the valve blocks flow of fluid between the wellhead and the at least one first port, and
    wherein the valve is configured to move to the open position by a supply of pressurized fluid to the first part of the through channel.

2. The valve arrangement according to claim 1, wherein the actuator rod is located inside the first part of the through channel.

3. The valve arrangement according to claim 1, wherein at least a part of the actuator rod comprises a hollow tube provided with perforations made at an angle to its direction of movement.

4. The valve arrangement according to claim 1, wherein the piston-cylinder arrangement comprises a movable piston that is connected to the actuator rod.

5. The valve arrangement according to claim 4, wherein the control device is configured to control a movement of the piston and thereby control the movement of the actuator rod connected to the piston.

6. The valve arrangement according to claim 1, wherein the control device is configured to be manually operable.

7. The valve arrangement according to claim 1, wherein the piston-cylinder arrangement comprises a cylinder that is fixed inside the second part of the through channel and the cylinder has a through bore, and the piston-cylinder arrangement comprises a piston that is movable inside a first part of the through bore in a sealing manner, the first part is open towards the first part of the channel, the piston is a part of the actuator device, wherein the actuator rod is connected to the piston, the piston being movable in relation to the cylinder by means of the control device.

8. The valve arrangement according to claim 7, wherein the through bore of the cylinder of the piston-cylinder arrangement comprises a second part, wherein the second part is open towards an exterior of the housing and configured to receive the control device in order for the control device to engage with the piston.

9. The valve arrangement according to claim 8, wherein the control device comprises a control tool that is insertable into the second open part of the through bore of the cylinder.

10. The valve arrangement according to claim 8, wherein the second part of the through bore comprises a threaded section and the control device comprises a control tool having a threaded shaft and a turning handle for turning the threaded shaft, wherein the threaded shaft is configured to be insertable into the second part of the through bore and to enter into threaded engagement with the threaded section and to engage with an end part of the piston when inserted into the second part of the through bore.

11. The valve arrangement according to claim 9, wherein the control tool is removable from the valve arrangement.

12. The valve arrangement according to claim 1, wherein the cylinder of the piston-cylinder arrangement is connected to the housing by a thread connection and fulfils a function of a valve removal plug.

* * * * *